(12) United States Patent
Schierholz

(10) Patent No.: US 9,053,396 B2
(45) Date of Patent: Jun. 9, 2015

(54) PRINTING OBJECT AND PRINTER FOR PRINTING A PRINTING OBJECT

(75) Inventor: Albrecht Schierholz, Schieder-Schwalenberg (DE)

(73) Assignee: PHOENIX CONTACT GMBH & CO. KG (DE)

( * ) Notice: Subject to any disclaimer, the term of this patent is extended or adjusted under 35 U.S.C. 154(b) by 7 days.

(21) Appl. No.: 13/816,487

(22) PCT Filed: Aug. 12, 2011

(86) PCT No.: PCT/EP2011/063922
§ 371 (c)(1),
(2), (4) Date: Jun. 11, 2013

(87) PCT Pub. No.: WO2012/020117
PCT Pub. Date: Feb. 16, 2012

(65) Prior Publication Data
US 2013/0248603 A1    Sep. 26, 2013

(30) Foreign Application Priority Data

Aug. 12, 2010  (DE) .......................... 10 2010 036 968
Sep. 15, 2010  (DE) .......................... 10 2010 037 564

(51) Int. Cl.
*G06K 7/10*    (2006.01)
*G06K 7/00*    (2006.01)
(Continued)

(52) U.S. Cl.
CPC .......... *G06K 19/06009* (2013.01); *G06K 19/06* (2013.01); *G06K 7/10* (2013.01);
(Continued)

(58) Field of Classification Search
CPC ............. G06K 7/00; G06K 7/10; G06K 7/14;
G06K 7/1434; G06K 5/04; G06K 19/06;
G06K 19/06018; G06K 2017/0087; G07B
2017/0058; G07B 2017/00588; H04N
1/00379; H04N 1/00681; H03M 1/308;
B41J 11/009
USPC .............. 235/435, 439, 454, 462.01, 462.08,
235/462.16
See application file for complete search history.

(56) References Cited

U.S. PATENT DOCUMENTS 5,051,779 A    9/1991   Hikawa
5,984,193 A    11/1999  Uhling
(Continued)

FOREIGN PATENT DOCUMENTS

CN    1227797 A    9/1999
JP    61-205155    9/1986
(Continued)

OTHER PUBLICATIONS

International Search Report for International Patent Application PCT/EP2011/063922 mailed Jul. 12, 2011.
(Continued)

*Primary Examiner* — Thien M Le
*Assistant Examiner* — Claude J Brown
(74) *Attorney, Agent, or Firm* — Knobbe, Martens, Olson & Bear LLP

(57) ABSTRACT

The invention relates to a printing object (10) and a printer (11) for printing a printing object (10). The printing object (10) has a printable printing region (1) and an identification region (2), wherein an identification mark is provided in the identification region (2). According to the invention, a barcode identification mark (4, 5) with a plurality of individual bars (6) arranged behind one another is provided as identification mark. In this way, a printing object (10) is provided, by way of which it can be ensured in a simple and reliable way that optimum printing takes place.

14 Claims, 2 Drawing Sheets

Figure 1:
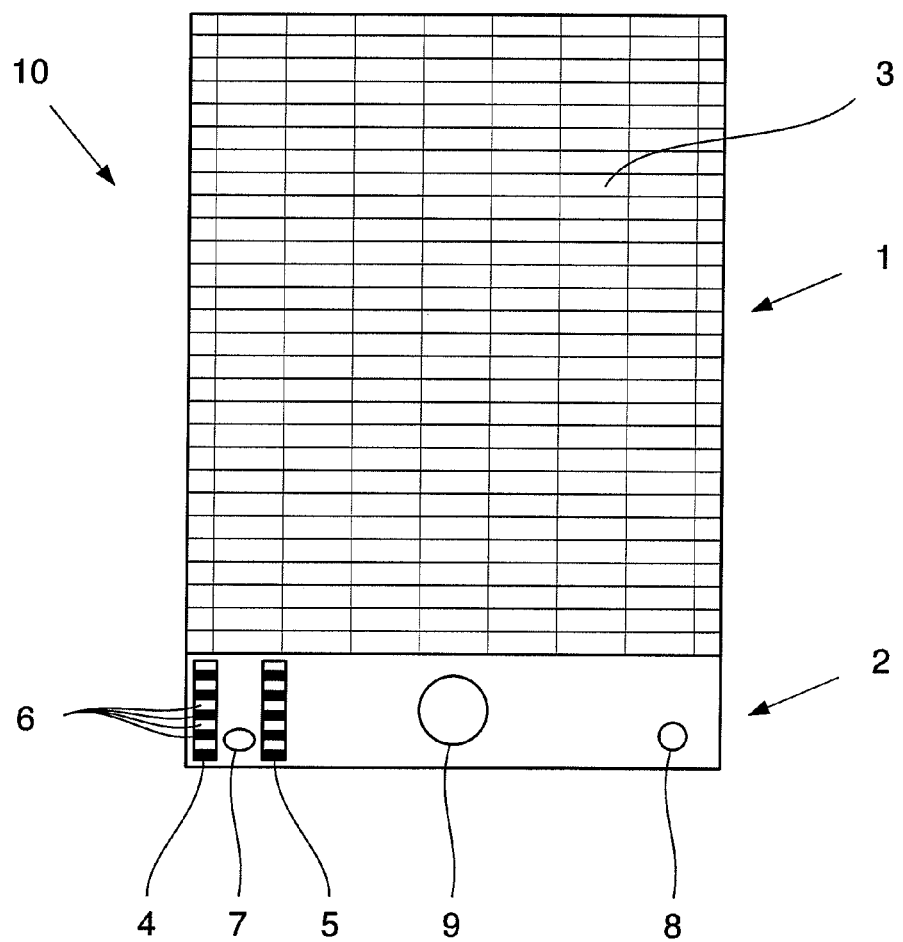

(51) Int. Cl.
*G06K 5/04* (2006.01)
*G06K 19/06* (2006.01)
*G06K 7/14* (2006.01)
*B41J 3/407* (2006.01)
*B41J 11/00* (2006.01)
*B41J 3/00* (2006.01)

(52) U.S. Cl.
CPC . *G06K 5/04* (2013.01); *G06K 7/14* (2013.01); *G06K 7/00* (2013.01); *B41J 3/407* (2013.01); *B41J 11/008* (2013.01); *B41J 3/00* (2013.01)

(56) References Cited

U.S. PATENT DOCUMENTS

| | | | |
|---|---|---|---|
| 5,991,409 A * | 11/1999 | Windel et al. | 705/62 |
| 6,241,242 B1 * | 6/2001 | Munro | 271/252 |
| 8,303,100 B2 | 11/2012 | Schierholz et al. | |
| 2002/0074405 A1 * | 6/2002 | Hadano et al. | 235/462.08 |
| 2003/0072019 A1 | 4/2003 | Haines et al. | |
| 2005/0087602 A1 * | 4/2005 | Scannell | 235/462.01 |
| 2005/0121528 A1 | 6/2005 | Lubow | |
| 2006/0261168 A1 | 11/2006 | Bybell et al. | |
| 2007/0002372 A1 * | 1/2007 | Sekizawa | 358/1.15 |
| 2007/0086638 A1 * | 4/2007 | Ackley et al. | 382/132 |
| 2007/0102522 A1 * | 5/2007 | McQueen et al. | 235/462.01 |
| 2007/0145137 A1 * | 6/2007 | Mrowiec | 235/462.01 |
| 2007/0217849 A1 * | 9/2007 | Handa et al. | 400/62 |
| 2007/0225055 A1 * | 9/2007 | Weisman | 463/11 |
| 2008/0257961 A1 * | 10/2008 | Lubow | 235/462.01 |
| 2010/0044446 A1 * | 2/2010 | Shah | 235/494 |
| 2010/0084469 A1 * | 4/2010 | Kuyper-Hammond et al. | 235/462.01 |
| 2011/0006117 A1 * | 1/2011 | Wang | 235/462.01 |
| 2011/0029429 A1 * | 2/2011 | Whitehouse | 705/39 |

FOREIGN PATENT DOCUMENTS

| | | |
|---|---|---|
| JP | 07-137354 | 5/1995 |
| JP | 8234414 A | 9/1996 |
| JP | 2005-022130 | 1/2005 |
| JP | 2009-233916 | 10/2009 |
| WO | WO 2012/020117 | 2/2012 |

OTHER PUBLICATIONS

Chinese Office Action, and its English Translation, dated Jul. 2, 2014 in Patent Application No. 201180045534.0/2014062701096480.

* cited by examiner

PRINTING OBJECT AND PRINTER FOR PRINTING A PRINTING OBJECT

REFERENCE TO RELATED APPLICATIONS

The present application is the U.S. National Phase under 35 U.S.C. §371 of International PCT application number PCT/EP2011/063922, filed Aug. 12, 2011, which claims priority to German Application No. 10 2010 036 968.3, filed Aug. 12, 2010, and to German Application No. 10 2010 037 564.0, filed Sep. 15, 2010, each of which is incorporated herein by reference in its entirety.

The invention relates to a printing object, for printing by means of a printer, preferably by means of a thermal transfer printer, having a printable printing region and an identification region, wherein an identification mark is provided in the identification region.

Printing objects of the type mentioned in the introduction are well known from practice and are typically used to apply housing or connector identification marks, for example in the form of labels, identification cards, inlay tags, tag plates or identification tags. These are often printing objects fabricated from a plastics material and finished such that they only still have to be printed by the user in a printer provided for this purpose.

Thermal transfer printers have proven to be particularly suitable for the printing of printing objects of this type. A problem with thermal transfer printing however is that the printing parameters, such as printing temperature, printing speed, material of the printing object and thickness of the printing object, have to be matched precisely to one another so as to ensure an optimal print image. The prior art has not previously provided any possibilities for ensuring in a simple and cost-effective manner that a printing object is only printed once all parameters for the printing process are correct.

The object of the invention is therefore to provide a printing object of this type and a printer of this type for printing a printing object, with which an optimal printing process can be ensured in a simple and reliable manner.

This object is achieved by the subjects of the independent patent claims. Preferred developments are described in the dependent claims.

In accordance with one solution, the above-mentioned object is thus achieved by a printing object, for printing by means of a printer, preferably by means of a thermal transfer printer, having a printable printing region and an identification region, wherein an identification mark is provided in the identification region, characterised in that a barcode identification mark with a plurality of individual bars arranged in succession is provided as an identification mark.

In accordance with the invention, the printing object is thus provided with a particularly easily applicable identification mark, namely with a barcode identification mark. The specific type of printing object can be clearly indicated by the barcode identification mark, and therefore the correct printing parameters can be ensured via the specific type of printing object.

The barcode identification mark has a plurality of individual bars arranged in succession, wherein the individual bars have a predetermined length and width. In this regard, the individual bars are typically formed as rectangles, which are arranged in succession.

Two types of individual bars are typically provided, namely light and also dark individual bars, preferably white and black individual bars to provide a maximum contrast.

As already mentioned, a barcode identification mark of this type can be applied very easily to the printing object. In this regard, the barcode identification mark is printed onto the printing object in accordance with a preferred development of the invention.

Besides easy applicability of a barcode identification mark to a printing object, a barcode identification mark of this type can also be captured using very simple means, namely by means of a reflex sensor for example. In contrast to other solutions known from the prior art, with which either mechanical structures have to be traced or information has to be obtained from an RFID chip, the detection of a barcode identification mark by means of a reflex sensor is considerably simplified.

In principle, it is not necessary to provide the printing object with further devices in addition to the barcode identification mark. In accordance with a preferred development of the invention however, a hole pattern for positioning and/or fixing the printing object in a printer is provided. In this case, it may be sufficient for the hole pattern to have a single hole. It is thus possible for example to fit the printing object along one edge to a corresponding edge of the printer and to position and fix the printing object precisely via the individual hole. In accordance with a preferred development of the invention however, at least two holes are provided, wherein these holes are preferably different from one another. The two holes most preferably differ from one another in such a way that the device on the printer corresponding to one respective hole only fits into the respective hole with a single predetermined orientation of the printing object. This can be achieved for example if both holes consist of two ovals of equal size, wherein the orientations of the ovals are different from one another however, for example one oval is turned through 90° with regard to its longitudinal direction relative to the other oval.

In principle, the hole pattern can be provided in any region of the printing object. In accordance with a preferred development of the invention however, the hole pattern is arranged in the identification region. This has the advantage that the entire printing region is thus available for printing, and also that the finished printing object no longer has any bothersome holes after the printing process if the identification region can be separated from the printing object.

In accordance with a preferred development of the invention, the following is true for the length l of the individual bars in the longitudinal direction of the individual bars, that is to say in the direction of the individual bars arranged in succession: l≥1.5 mm, preferably l≥1.8 mm, most preferably l≥2.0 mm. Furthermore, in accordance with a preferred development of the invention the following is true for the length l of the individual bars in the longitudinal direction of the individual bars: l≤4 mm, preferably l≤4 mm, most preferably l≤2.5 mm. Furthermore, in accordance with a preferred development of the invention the following is true for the width b of the individual bars in the transverse direction of the individual bars arranged in succession: 2 mm≤b≤10 mm, preferably 2 mm≤b≤8 mm, most preferably 2 mm≤b≤6 mm. It has been found that, if the individual bars are dimensioned in this way, the barcode identification mark can be captured optimally with only a small spatial requirement therefor.

In principle, the printing object may consist of various materials, such as paper or card. In accordance with a preferred development of the invention however, the printing object consists of a flat material made of plastic. Preferred labelling materials are PVC and PET. PVC cards with a thickness between 0.3 mm and 0.5 mm, PET cards with a thickness of approximately 0.17 mm, and PET films with a thickness of approximately 0.2 mm are most preferably provided.

In principle, it may be sufficient to provide a single barcode identification mark in the identification region of the printing object. In accordance with a preferred development of the invention however, two barcode identification marks are arranged in the identification region. Specifically, it has been found that if only a single barcode identification mark is provided, the printing object can then no longer be printed under some circumstances if the barcode identification mark cannot be captured correctly before printing by the corresponding printer. For example, this poses a problem if the barcode identification mark is soiled or creased.

In this regard, the two barcode identification marks are preferably identical. The above-mentioned problem is remedied in that the barcode identification mark is practically "repeated" in the identification region. This means that the barcode identification mark is provided again at another point within the identification region. If one of the barcode identification marks is illegible, the other barcode identification mark is thus always available so as to clearly identify the printing object and ensure the compilation of the correct printing parameters.

Alternatively to the provision of identical barcode identification marks, the two barcode identification marks are inverted relative to one another, at least partially and preferably completely, in accordance with a preferred development of the invention. Another preferred development of the invention lies in arranging the barcode identification marks so as to be rotated through 180° relative to one another.

In principle, the printing object may follow different shapes, but in accordance with a preferred development the printing object is rectangular. In this case, the identification region is provided exclusively in an edge region along a single side of the printing object in accordance with a preferred development of the invention, and both barcode identification marks are provided in this identification region. The printer therefore does not have to spend much time "looking" before the printing process in order to capture the barcode identification marks. Rather, the barcode identification marks are both provided in this way in a predetermined region, which for example may be provided at the start or at the end of the printing object to be moved through the printer.

Many possibilities are also conceivable with regard to the orientation of the two barcode identification marks. In accordance with a preferred development however, the two barcode identification marks run parallel to one another. This means that the sequences of the individual bars point in the same direction in both barcode identification marks. In this case it is not absolutely necessary in principle for the barcode identification marks to both be provided on the printing object at the same height. In accordance with a preferred development of the invention however, the individual bars corresponding to one another of the two barcode identification marks are arranged exactly opposite one another.

In practice, this means that the two barcode identification marks, of which the sequence of individual bars is identical in any case, begin at the same height or length of the printing object and then run parallel in such a way that any change from one individual bar to the next individual bar takes place at the same height or length of the printing object. For example, this has the advantage that both barcode identification marks can be captured at the same time, for example as the printing object is moved through the printer, and therefore the second barcode identification mark is only captured if the first barcode identification mark has not been captured clearly, for example due to soiling.

In this case, the two barcode identification marks running parallel to one another and arranged exactly opposite one another can be arranged at a distance on the printing object, such that they can be captured by means of a single reflex sensor. It has proven to be advantageous however if the two barcode identification marks are arranged further apart so that they can be captured separately from one another by different reflex sensors. In accordance with a preferred development of the invention, the following is true in this regard for the gap z between the two barcode identification marks: 10 mm≤z≤65 mm, preferably 15 mm≤z≤50 mm, most preferably 20 mm≤z≤30 mm.

The object mentioned further above is also achieved by a printer, for printing a printing object as described before, characterised in that a reflex sensor is provided to capture a barcode identification mark.

As already discussed further above, a reflex sensor for capturing an identification mark of a printing object is a very cost effective and also reliable solution, which involves much less effort compared to the provision of an RFID sensor known from the prior art.

In principle, it may be sufficient to provide a single reflex sensor. In accordance with a preferred development of the invention however, two separate reflex sensors are provided, with each of which a respective one of two barcode identification marks arranged at a distance from one another can be captured, preferably at the same time. This has the advantages already described further above in terms of the (preferably simultaneous) capture of two barcode identification marks arranged adjacently.

In principle, the reflex sensor or the reflex sensors can be arranged movably within the printer, for example slidably or pivotably. Movement of the printing object within the printer is thus unnecessary. In accordance with a preferred development of the invention however, the printer has a transport slide, with which the printing object is movable within the printer in the longitudinal direction of the barcode identification mark. Static reflex sensors can thus be provided, which is much more cost effective and the operation of which is also more reliable in addition.

Figure 2:
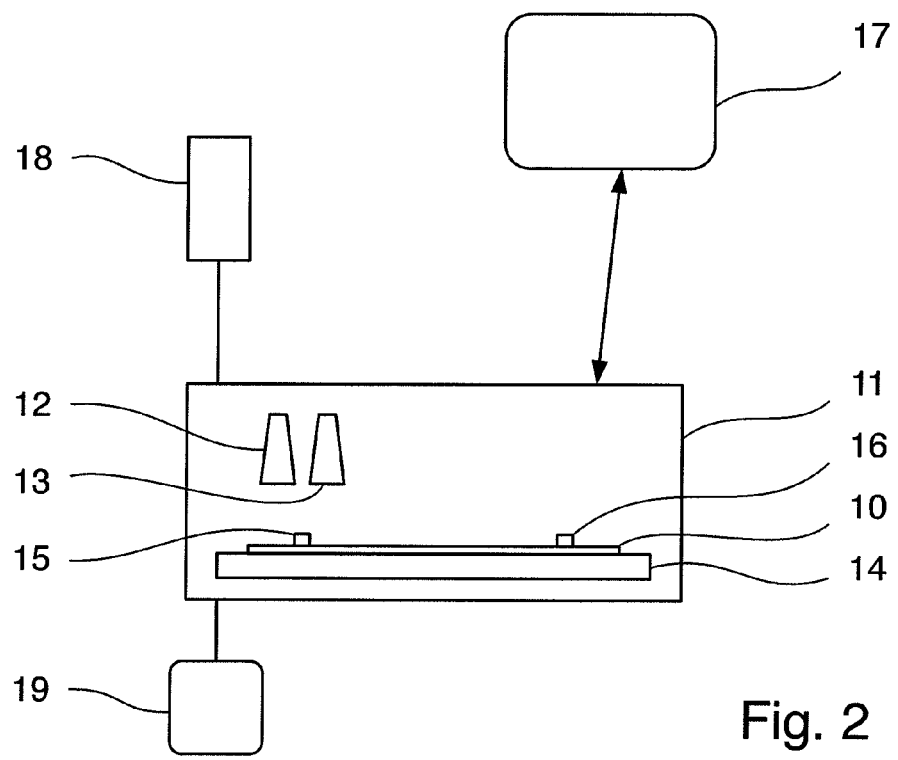
Figure 3:
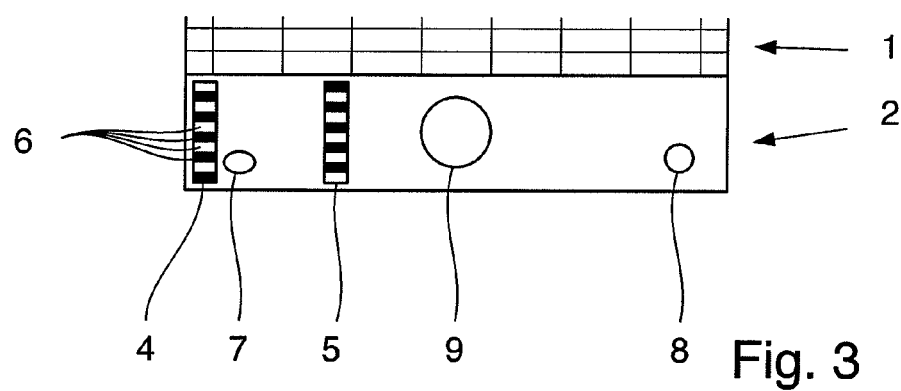

The invention will be explained in greater detail hereinafter with reference to the drawing on the basis of preferred exemplary embodiments:

In the drawing:

FIG. 1 shows a printing object in accordance with a preferred exemplary embodiment of the invention, FIG. 2 shows a printer in accordance with a preferred exemplary embodiment of the invention for printing objects of this type, and FIG. 3 shows a detail of a printing object in accordance with another preferred exemplary embodiment of the invention.

A printing object 10 in accordance with a preferred exemplary embodiment of the invention can be seen in FIG. 1. The printing object 10 is provided for printing by means of a printer 11, as can be seen in accordance with a preferred exemplary embodiment of the invention from FIG. 2.

The printing object 10 has a printable printing region and an identification region 2. The printable printing region 1 is provided in the present case as a type of table 3, in which information, such as sequences of numbers and/or letters, can be printed by means of the printer 11. Other embodiments of the printing region 1 are possible.

The identification region 2 is provided below the printing region 1. The identification region 2 has two barcode identification marks 4, 5 as an identification mark. In this case the barcode identification mark 4 is identical to the barcode identification mark 5, that is to say the two barcode identification marks 4, 5 have the same sequence of successively arranged individual bars 6.

Apart from the fact that the two barcode identification marks 4, 5 are identical, that is to say they supply the same information concerning the specific type of the printing object 10 when captured, the two barcode identification marks 4, 5 are also oriented parallel to one another, more specifically at the same height within the identification region 2. This means that the individual bars 6 corresponding to one another of the barcode identification marks 4, 5 are arranged exactly opposite one another.

Apart from the barcode identification marks 4, 5, a hole pattern consisting of two positioning openings 7, and a gripper opening 9 are provided in the identification region 2 of the printing object.

FIG. 2 shows a schematic sectional view of the printer in accordance with the preferred exemplary embodiment of the invention. This printer 11 has two reflex sensors 12, 13, with each of which a respective one of the two barcode identification marks 4, 5 can be captured. To receive the printing object 10, the printer 11 has a transport slide 14. In order to position and fix the printing object 10 securely and clearly on the transport slide 14, two positioning pins 15, 16 are arranged on the transport slide 14. The positions of the positioning pins 15, 16 correspond to the positions of the positioning openings 7, 8. The printing object is thus secured against rotation.

The transport slide 14 is arranged movably within the printer 11, more specifically in such a way that the printing object 10 can be moved in the longitudinal direction of the barcode identification marks 4, 5. This movement corresponds to a movement of the transport slide 14 with the printing object 10 into and out from the drawing plane of FIG. 2.

With a movement of this type of the printing object 10 provided on the transport slide 14, the two barcode identification marks 4, 5 are passed beneath the two reflex sensors 12, 13. The reflex sensor 12 can thus capture the sequence of the individual bars 6 of the barcode identification mark 4. The same is true for the reflex sensor 13 and the individual bars 6 of the barcode identification mark 5. In particular, it is thus possible to capture both barcode identification marks 4, 5 at the same time, namely during a single movement of the printing object 10 provided on the transport slide 14. If one of the two barcode identification marks is faulty, for example creased or soiled, this is then unproblematic, since it is possible to revert to the other barcode identification mark 5, 4.

The method for printing a printing object 10 is then as follows: In addition to the actual printing data and necessary control data, information for labelling the printing object 10 to be printed as well as a material number are sent to the printer via a computer 17 connected to the printer 11. Once the printer 11 has received this data, the labelling of the printing object 10, for example in the form of an article number, is displayed by means of a display 18, and the user is prompted to insert the corresponding printing object 10 having the correct article number into the printer 11. Once the insertion of the printing object 10 has been acknowledged by the user via a keyboard 19, the printer 11 draws in the printing object 10 by moving the transport slide 14. A touchscreen may also be provided as an alternative to a display 18 and a keyboard 19.

As the printing object 10 is drawn in, the respective barcode identification marks 4 and 5 are captured by means of the two reflex sensors 12, 13. If a captured barcode identification mark 4, 5 corresponds to the predefined article number, it can be assumed that the correct printing object 10 has been inserted. In this regard, the actual printing process is then carried out automatically. If the barcode identification marks 4, 5 do not correspond to the expected article number, an error message appears in the display 18 and the user is prompted to insert the correct printing object 10.

It is also possible for no barcode identification mark to be captured by means of the reflex sensors 12, 13. This indicates that a printing object has not been inserted, and therefore a message regarding the absence of a printing object is displayed on the display 18.

In the two last-mentioned cases, in which either the wrong printing object 10 or else no printing object has been inserted, a printing process is not begun so as to avoid sub-optimal printing and to avoid printing without a printing object present, which could damage the printer 11.

As a result of this checking process before the start of the printing process, it is possible to ensure that printing only takes place if the expected printing object 10 is inserted, and therefore the control data transferred from the computer 17 to the printer 11 concerning parameters such as printing temperature and printing duration are actually correct. An optimal print image is thus always ensured, and damage to the printer 11 caused by misuse is avoided.

Lastly, FIG. 3 shows a detail of a printing object in accordance with another preferred exemplary embodiment of the invention. In this case, the two barcode identification marks 4, 5 are inverted relative to one another and, in contrast to the arrangement shown in FIG. 1, are arranged at a further distance from one another. This means that the barcode identification mark 4 has a sequence of inverted individual bars 6 arranged in succession relative to the barcode identification mark 5. In addition, the two barcode identification marks 4, 5 are also oriented parallel to one another in this case, more specifically at the same height within the identification region 2, which in the present case means that individual bars 6 inverted relative to one another and therefore corresponding to one another are arranged exactly opposite one another.

LIST OF REFERENCE SIGNS printable printing region 1
identification region 2
table 3
barcode identification mark 4
barcode identification mark 5
individual bars 6
positioning opening 7
positioning opening 8
gripper opening 9
printing object 10
printer 11
reflex sensor 12
reflex sensor 13
transport slide 14
positioning pin 15
positioning pin 16
computer 17
display 18
keyboard 19

The invention claimed is:

1. A printing object, for printing by means of a printer, comprising:
   a printable printing region;
   an identification region comprising an identification mark, the identification mark including two barcodes having a plurality of individual bars arranged in succession,
   wherein the two barcodes are inverted relative to one another and separated by a gap z between the two barcodes having a distance in the range of 10 mm≤z≤65 mm; and
   a hole pattern for positioning the printing object in the printer.

2. The printing object of claim 1, wherein the individual bars have a length l in a longitudinal direction of the individual bars in the range of 1≤4 mm, and a width b of the individual bars in a transverse direction of the individual bars in the range of 2 mm≤b≤10 mm.

3. The printing object of claim 2, wherein the length l is in the range of l≤2.5 mm.

4. The printing object of claim 2, wherein the width b is in the range of 2 mm≤b≤8 mm.

5. The printing object of claim 2, wherein the width b is in the range of 2 mm≤b≤6 mm.

6. The printing object of claim 1, wherein the two barcodes are identical.

7. The printing object of claim 6, wherein in the printing object is rectangular, the identification region is provided exclusively in an edge region along a single side of the printing object, and each of the two barcodes is provided in the identification region.

8. The printing object of claim 1, wherein the printing object is rectangular, the identification region is provided exclusively in an edge region along a single side of the printing object, and each of the two barcodes is provided in the identification region.

9. The printing object of claim 8, wherein the two barcodes run parallel to one another.

10. The printing object of claim 9, wherein the individual bars corresponding to one another of the two barcodes are also arranged exactly opposite one another.

11. The printing object of claim 1, wherein the gap z between the two barcodes has a distance in the range of 15 mm≤z≤50 mm.

12. The printing object of claim 1, wherein the printer is a thermal transfer printer.

13. The printing object of claim 1, wherein the two barcodes are rotated 180° relative to one another.

14. The printing object of claim 1, wherein the gap z has a distance in the range of 20 mm≤z≤30 mm.

* * * * *

UNITED STATES PATENT AND TRADEMARK OFFICE
CERTIFICATE OF CORRECTION

PATENT NO.        : 9,053,396 B2                          Page 1 of 1
APPLICATION NO.   : 13/816487
DATED             : June 9, 2015
INVENTOR(S)       : Albrecht Schierholz It is certified that error appears in the above-identified patent and that said Letters Patent is hereby corrected as shown below:

Specification

In column 4 at line 60, After "region" insert --1--.

In column 5 at line 16, After "7," insert --8--.

Claims

In column 7 at line 15, In Claim 2, change "1" to --1--.

Signed and Sealed this
Twenty-second Day of March, 2016

Michelle K. Lee
*Director of the United States Patent and Trademark Office*